United States Patent [19]

Wyman

[11] 4,060,009

[45] Nov. 29, 1977

[54] BALANCING ROTORS

[75] Inventor: Howard John Wyman, Kenilworth, England

[73] Assignee: Chrysler United Kingdom Limited, London, England

[21] Appl. No.: 625,242

[22] Filed: Oct. 23, 1975

[30] Foreign Application Priority Data

Oct. 30, 1974 United Kingdom ............... 46987/74

[51] Int. Cl.² ............................................. F16F 15/22
[52] U.S. Cl. .................................... 74/573 R; 74/572;
301/5 BA; 64/1 V
[58] Field of Search .................... 64/1 V; 74/573, 572;
301/5 BA

[56] References Cited

U.S. PATENT DOCUMENTS

| 1,254,694 | 1/1918 | Humphries | 74/572 |
| 3,433,534 | 3/1969 | Mercer | 74/573 |
| 3,682,017 | 8/1972 | Mayer | 74/573 |
| 3,939,020 | 2/1976 | Caramanian | 74/573 |

FOREIGN PATENT DOCUMENTS 832,048   4/1960   United Kingdom ............ 301/5 BA Primary Examiner—Allan D. Hermann
Assistant Examiner—Randall Heald
Attorney, Agent, or Firm—Edward F. Connors

[57] ABSTRACT

A rotor to be balanced has an annular cavity containing two balls free to roll around the cavity. An initially inert thermo-setting adhesive is coated around the cavity. The rotor is rotated to a speed just above its first resonant frequency of vibration and the balls take up balancing positions in the cavity counter balancing the out of balance of the shaft. The adhesive is activated by a temporarily placed external heat source to permanently lock the balls in the balancing position so that the shaft is permanently balanced.

8 Claims, 2 Drawing Figures

BALANCING ROTORS

BACKGROUND OF THE INVENTION

1. Field of the Invention

The invention relates to balancing rotors and is particularly although not exclusively applicable to balancing of motor vehicle propeller shafts.

2. Description of the Prior Art

U.K. Patent Specification No. 832048 discloses an automatic balancing device comprising a housing having an annular cavity filled with a dampening fluid, for example oil or ethylene glycol. Within the dampening fluid, rolling bodies are arranged to be freely movable. Should an unbalance occur in the rotary body during operation thereof, the rolling bodies will roll around the annular cavity and will assume, under the action of the components of force set up by the unbalance, positions in which they compensate for the out of balance. The specification also discloses the use of a solid but low melting point damping medium which can render the balls substantially immovable when cold, for example during a starting period or during any other phase of operation. The damping medium may be melted either by friction occurring during operation of the rotating body or by external heating.

The disadvantage with the device having a damping fluid described above is that the rolling bodies will tend to move out of their balancing positions when the device is at rest so that the device will always be out of balance when it is started from rest and will not be in balance until it has been rotated above its resonant frequency speed.

The disadvantage with the device having a low melting point damping medium described above is that heating of the damping medium causing it to melt and allowing the rolling bodies to move will occur in use of the device so that the bodies can move out of the balancing positions if the device is not rotating just above its resonant frequency speed and the bodies could then act to increase the out of balance of the device.

It is an object therefore of the present invention to provide a method and means for balancing a rotor in which the rotor, once balanced, remains permanently balanced.

SUMMARY OF THE INVENTION

The invention provides a method of balancing an out-of-balance rotor comprising the steps of providing within a cavity encircling the rotor axis a plurality of weights which are free to move around the cavity, the cavity and or said weights having an initially inert adhesive surface which can be activated to bond the weights to the cavity in the required positions, rotating the shaft to a speed at which the shaft is between two frequencies of vibration and is nearer the lower of those frequencies (i.e. in a mass controlled state) so that the weights take up positions within the cavity which counteract any out-of-balance condition of the shaft and then activating the adhesive surface of the weights and or cavity to bond the weights to the cavity in the balancing position.

The invention also provides a rotor (e.g. a vehicle propeller shaft) having a cavity around the rotor axis and provided within the cavity with a plurality of weights which are free to move around the cavity, the cavity and or said weights having an initially inert adhesive surface for subsequent activation for securing the weights in balancing positions when the rotor is rotated at or above a resonant frequency.

DESCRIPTION OF THE PREFERRED EMBODIMENTS

Figure 1:
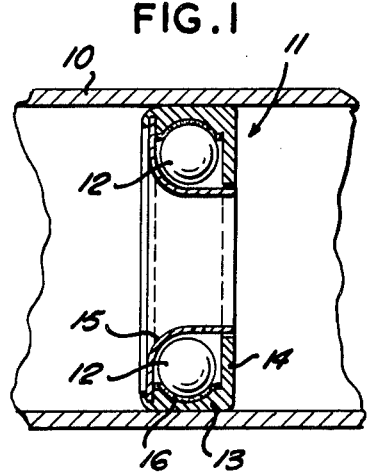
FIG. 1 is a sectional view through part of a vehicle propeller shaft having a balancing device; and, FIG. 2 is a sectional view through part of a vehicle propeller shaft having an alternative form of balancing device.

Referring firstly to FIG. 1 of the drawings, there is shown a part 10 of a vehicle propeller shaft which is generally of hollow cylindrical form.

The hollow propeller shaft contains an annular hollow housing 11 containing two balls 12. The housing comprises a rigid outer wall 13 providing, on its inner surface, a race for the balls 12 to run and having an integral rigid side wall 14. The housing is closed by an L-section cover 15 one limb of which is secured by spinning over or staking to the opposite side of the outer wall to side wall 14. The end of the other limb of the cover is spaced immediately inwardly of the inner periphery of the side wall 14.

The inner surface of the wall 13 providing the race for the balls is coated with a thermo-setting adhesive 16 such as an epoxy resin.

The propeller shaft is assembled on the vehicle with the balls 12 free to rotate around the housing 11. The shaft, which is to be balanced, is rotated to a speed at which the unbalanced shaft is just above a resonant or natural frequency of vibration (e.g. the first resonant frequency). For a particular conventional family saloon car, that speed is of the order of 3,000 R.P.M. At this speed, the balls take up positions around the housing to counteract the out of balance of the shaft so that the shaft is balanced. The adhesive is then activated as the shaft is rotated by indirect heating means such as a heating coil temporarily encircling the shaft at the location of the housing to secure permanently the balls in the housing in their balancing positions. The shaft is then balanced for all speeds.

Figure 2:
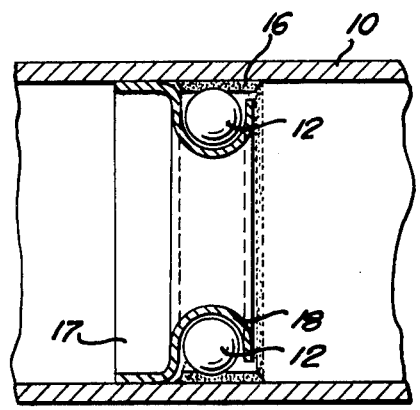

FIG. 2 shows an alternative construction in which the housing 11 is replaced by a retainer 17 for the balls 12 in the form of an annular outwardly facing C-section wall 18 in which the balls 12 run and having an annular skirt extending from one side thereof, the skirt being a press fit in the shaft. The propeller shaft itself is provided with the coating of thermo-setting adhesive 16 opposite the C-section wall. As in the first embodiment, the balls are initially free to run over the adhesive coating 16. The shaft is turned at a speed at which the unbalanced shaft is just above a natural frequency of vibration. The balls take up positions which counterbalance the out of balance of the shaft and the balls are then permanently set in those positions by indirect heating of the adhesive.

It will be appreciated that different constructions to those of the embodiments described hereinbefore may be used without departing from the scope of the invention. For example the housing may be located on the shaft externally of the shaft.

I claim:

1. A method of balancing an out of balance rotor comprising the steps of providing within a cavity encircling the rotor axis a plurality of weights which are free to move around the cavity with the cavity and said weights being separated by an initially inert thermo-setting adhesive which freely permits movement of the weights within said cavity and which subsequently may be activated to permanently bond the weights to the cavity in the required positions, rotating the shaft to a speed at which the shaft is between two resonant frequencies of vibration and is nearer the lower of those frequencies so that the weights take up positions within the cavity which counteract any out of balance condition of the shaft and then temporarily applying heat to the region of the rotor having the cavity containing the weights so as to activate the adhesive and permanently lock the weights to the cavity in the balancing position.

2. A method as claimed in claim 1 wherein the two reasonant frequencies are the first and second resonant frequencies of vibration of the shaft.

3. A method as claimed in claim 1 wherein the shaft is rotated to a speed at which it is just above the lower of the two resonant frequencies of vibration.

4. A method as claimed in claim 1 wherein the rotor is a propeller shaft of a vehicle and wherein the propeller shaft is balanced when in situ on the vehicle.

5. A method as claimed in claim 1 wherein the thermosetting bonding agent is an epoxy resin.

6. A method as claimed in claim 1 wherein the heat is temporarily applied to the part of the rotor containing the cavity by temporarily encircling such part of the rotor with a high frequency heating coil.

7. A method as claimed in claim 1 in which the rotor is hollow with the weights being located in the hollow rotor itself or in a housing secured in or around the rotor.

8. A method as claimed in claim 1 wherein the rotor is a hollow annular housing and the weights comprise at least two balls located within and free to roll around the housing, the housing having said adhesive applied on its surface.

* * * * *